Feb. 11, 1958 S. E. MILLER 2,823,356

FREQUENCY SELECTIVE HIGH FREQUENCY POWER DIVIDING NETWORKS

Filed Dec. 11, 1952 2 Sheets-Sheet 1

INVENTOR
S. E. MILLER
BY Roy N. Porter
ATTORNEY

FREQUENCY SELECTIVE HIGH FREQUENCY POWER DIVIDING NETWORKS

Filed Dec. 11, 1952 2 Sheets-Sheet 2

INVENTOR
S. E. MILLER
BY Roy M. Porter
ATTORNEY

United States Patent Office 2,823,356

Patented Feb. 11, 1958

2,823,356

FREQUENCY SELECTIVE HIGH FREQUENCY POWER DIVIDING NETWORKS

Stewart E. Miller, Middletown, N. J., assignor to Bell Telephone Laboratories, Incorporated, New York, N. Y., a corporation of New York Application December 11, 1952, Serial No. 325,488

6 Claims. (Cl. 333—73)

This application is a continuation-in-part of my copending application Serial No. 216,132, filed March 17, 1951, now Patent 2,701,340, granted February 1, 1955, and relates to very high frequency or microwave electrical transmission systems, and, more particularly, to wave-guide bridge circuits for dividing predetermined amounts of electromagnetic wave energy of particular frequencies between a plurality of shielded transmission lines, such as wave guides.

One of the more useful circuit arrangements of ordinary low-frequency communication practice is the so-called bridge circuit or balance. One particular form, sometimes referred to as the hybrid coil, makes possible two-way operation of a telephone line. In the microwave frequency range in wave-guide circuits there has never been an exact equivalent of the hybrid coil, but there have been devised several wave-guide arrangements that perform quite analogous functions. These include the well-known hybrid junction or magic-tee, the directional coupler and the hybrid branching filter.

Reviewing briefly the properties of these three wave-guide components, it will be noted that each is a four-terminal wave-guide power dividing network in which a balance or a non-connection is maintained between some two of the wave-guide terminals regardless of the terminal to which initial power is applied. In the hybrid junction power applied to either of two conjugately related terminals divides equally between the two other or "adjacent" terminals of the junctions with none appearing in the other of the conjugately related pair, i. e., the "opposite" terminal. In the directional coupler, power divides usually in an unequal ratio between the two "forward" terminals, with substantially none appearing in the "backward" terminal. Because of the relative positions that these terminals occupy, the network appears to have the directionally selective characteristic from which its name is derived. The hybrid branching filter in addition is frequency selective. Power including a plurality of frequency components applied to one of the four terminals divides on the basis of frequency between two of the other terminals with none appearing in the fourth. Because of this property the circuit is used to branch or segregate one of a plurality of channels of multichannel wave energy.

As between the physical structures comprising each of these three components, that of the directional coupler is the simplest and most economical to manufacture. Essentially it consists of a main and an auxiliary shielded transmission line related by some particular coupling means along an interval of their lengths. In said copending application, which is primarily directed to the directional coupling characteristics obtained by particular couplings between two shielded lines, certain relationships are disclosed between the amount of wave power transferred between two lines and the distribution of coupling along the longitudinal length of the lines.

In accordance with and as an extension of certain principles of said disclosure, it is an object of the present invention to transfer portions of electromagnetic wave energy from one microwave transmission line into other microwave transmission lines, which portions may vary as desired from very small fractions of the power in the one line to complete power transfer of all of the power in the one line.

It is a further object of the invention to transfer all electromagnetic wave power of a given frequency, or frequency band, only from one line into another.

In one specific embodiment of the invention to be disclosed in accordance with the last-mentioned object, two microwave transmission lines are coupled by a plurality of frequency-sensitive elements, each element coupling a specific fraction of the wave energy of a given frequency or frequency band in one line into the second line. As will be disclosed, this fraction bears such a relationship to the total number of elements, that all of the wave power of the given frequency or frequency band will be transferred to and launched directionally in the second line. The resulting frequency-selective coupling system thus exhibits electrical properties similar to the former hybrid branching or dropping filters but preserves the essential simplicity of the directional coupler.

In a second specific embodiment of the present invention, one-half of the wave power in one line is transferred to and launched directionally in the other line. In accordance with this type of embodiment a four-branch wave-guide bridge circuit is obtained in which power introduced at one branch appears at equal levels in a pair of adjacent branches but does not appear at the opposite or four branch. This is the electrical property found in the former hybrid junctions.

In other embodiments of the invention to be described, significant fractions of the total power in one line are transferred into at least two auxiliary lines, each similarly coupled to the one line.

It will be noted that in each of the bridge circuits to be disclosed, the balance is obtained by the principles well known in the directional coupler art. This balance, more specifically designated the directivity of the coupler, which determines the degree to which power is excluded from the backward terminal of the auxiliary line, is assumed to be made sufficiently large for all practical applications by the several ways known to the art including those fully described in my above-mentioned copending application. The present invention is principally concerned only with the magnitude of the induced forward traveling wave in the auxiliary line and the relative strength that it bears to the inducing traveling wave in the main line.

It has heretofore been predicted by mathematical analysis that it should be possible to relate two coupled lines so that power can be made to alternate in periodic fashion from one line to the other depending upon the parameters of the lines. The present invention reduces an aspect of this theoretical possibility to specific physical structures, designed to transfer the power in a first line to one or more other lines. The critical dimensions or parameters of the structures of the present invention are defined by what will be herein designated "the integrated coupling strength" factor which depends first upon the ratio of energy transferred from one line into the other by a specific coupling device, and second, upon the manner in which this coupling is distributed along a specific longitudinal length of the lines. The several precisely defined values of this integrated coupling strength factor provide power division in a directional coupler structure by which the electrical properties of the hybrid junctions and hybrid branching filters are duplicated.

These and other objects, the nature of the present invention, its various features and advantages, will appear more fully upon consideration of the various specific illustrative embodiments, shown in the accompanying drawings and analyzed in the following detailed description of these embodiments.

Figures 1, 1A, 1B, 2:
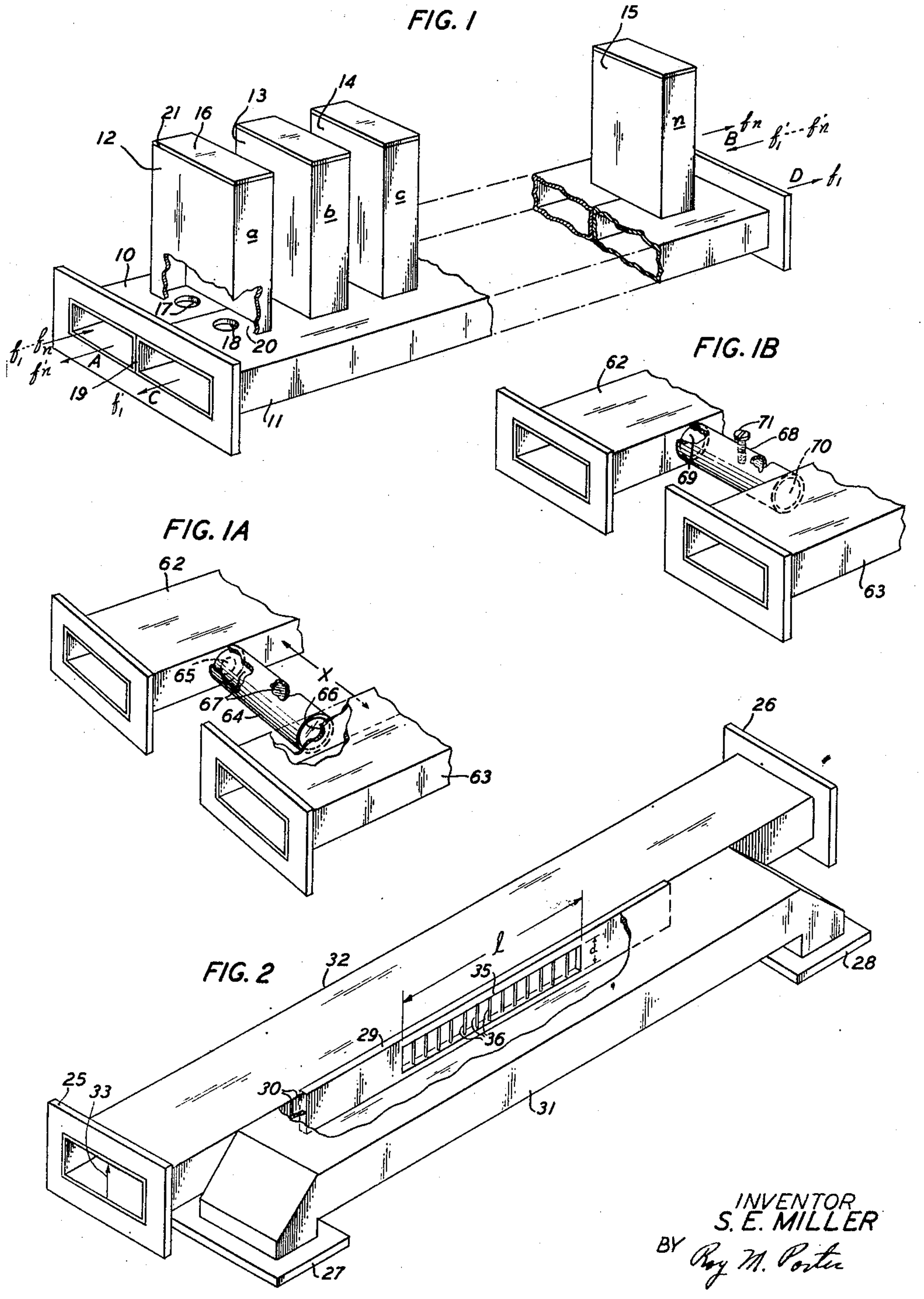
Fig. 1 shows in pictorial representation a microwave wave-guide coupled line filter in accordance with the invention.
Figs. 1A and 1B illustrate alternative coupling modifications for the filter of Fig. 1 in accordance with the invention.
Fig. 2 shows in pictorial form a microwave coupled line hybrid junction or bridge circuit in accordance with the invention.
Figure 3:
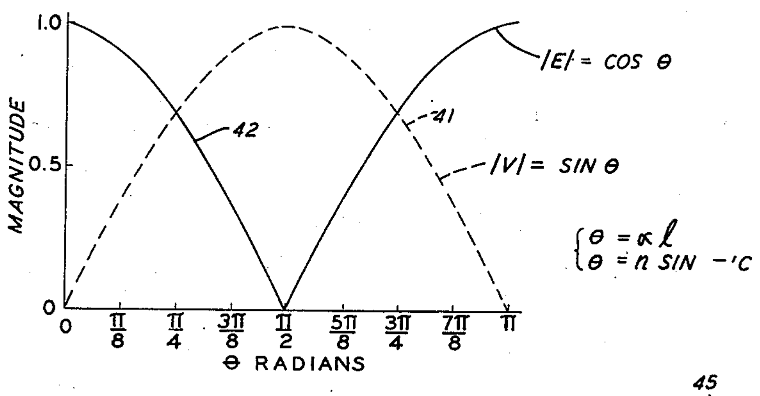
Figure 4:
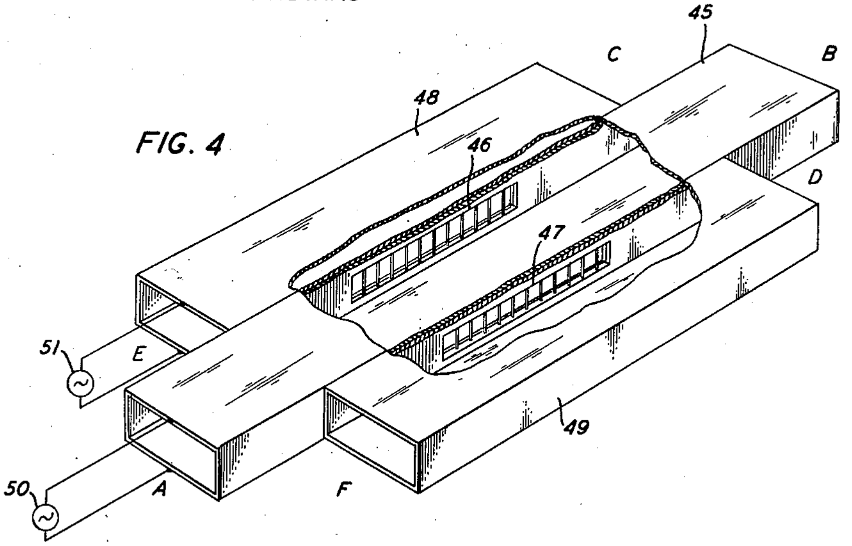
Figure 5:
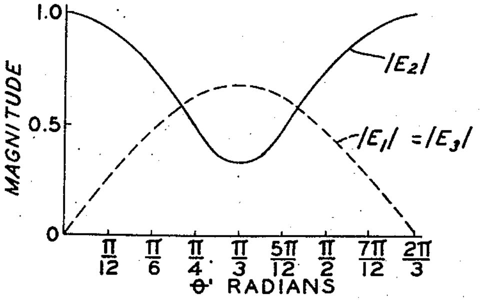
Figure 6:
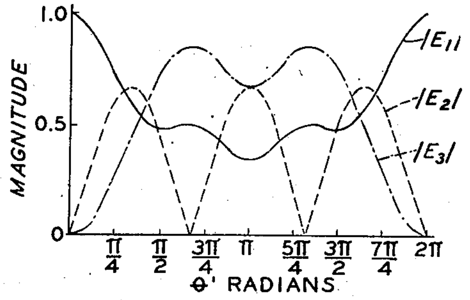

Fig. 3, given by way of explanation, illustrates the energy transfer versus the integrated coupling strength factor between the coupled lines of Fig. 1 and the coupled lines of Fig. 2;

Fig. 4 shows in pictorial form a microwave coupled three-line hybrid in accordance with the invention;

Fig. 5, given by way of explanation, illustrates the energy transfer versus integrated coupling strength factor between the coupled lines of Fig. 4 when the center line is driven; and Fig. 6 illustrates the energy transfer of the coupled lines of Fig. 4 when a side line is driven.

Referring specifically to Fig. 1, a frequency-sensitive coupled line bridge circuit is shown having the electrical properties of a hybrid branching circuit which may, therefore, be used to segregate or branch, on the basis of frequency, one of a plurality of channels of multichannel wave energy. This circuit comprises a first section 10 of transmission line of the metallic shield type for guiding wave energy coupled to a second section 11 of similar line running for a portion of its length substantially parallel to line 10. Lines 10 and 11 are illustrated as rectangular wave guides and are connected at intervals of less than one-half wavelength along this length by a plurality of *n* frequency-selective couplings, designated on Fig. 1 as *a*, *b*, *c* and *n*, each coupling a specified fraction of wave energy of a given fraquency or band of frequencies from one line to the other.

By way of illustrating one specific embodiment, each coupling comprises, as for example coupling *a*, a section of rectangular wave guide 12 arranged with its longitudinal axes substantially parallel with a common narrow wall 19 of guides 10 and 11 so that an open end 20 thereof encompasses substantially equal portions of the wider walls of guides 10 and 11. Guide 12 is oriented with its narrower transverse dimension parallel with the longitudinal axes of guides 10 and 11. The end 21 of guide 12 is closed either by a fixed plate 16 or by a similarly located variable piston. Apertures 17 and 18 open respectively into guides 10 and 11 in the portions of the walls thereof encompassed by guide 12. The resonant frequency of such a chamber is, of course, determined by the distance of plate 16 from end 20, this distance being usually a multiple of one-half of the resonant wavelength. The fraction of the power in one of the guides 10 or 11 which is coupled into the other through coupling of chamber 12 is determined principally by the size of the coupling irises resulting from apertures 17 and 18. Similar connecting sections of wave guide such as 13, 14 and 15, together with their associated irises and tuning plates constitute the other couplings *b* through *n*, respectively. These will be referred to hereinafter as coupling chambers, including within this term the wave-guide sections, the irises and the end plates.

All of the chambers 12 through 15 are tuned at the same frequency to pass the frequency components in the band of the particular channel to be branched and, therefore, to reject by reflection the frequency components in all other channels. In a typical microwave transmission system, each of the channels will have a relatively broad band width and the center frequency of each channel will be frequency spaced from the next adjacent channel by at least the band width of each channel. The intelligence bearing signals in each channel may comprise a pair of signal sidebands produced by modulating a carrier signal of frequency approximating the mid-band frequency of the channel with the intelligence signal by any of the well-known modulation methods. It will be convenient in the following discussion to designate the intelligence bearing signals in each channel by the frequency of the mid-band component of carrier frequency. Thus, the signal transmitted in a first channel, which is to be branched from the other channel frequencies, may be designated $f_1$ and the other channels $f_n$. Signals in all channels arriving from one direction may be designated $f_1 \ldots f_n$ and are applied to terminal A of the branching circuit. Channels from the other direction are designated $f_1' \ldots f_n'$ and are applied to the B terminal of the branching circuit.

As the energy of channel $f_1$ travels along guide 10, portions of it will be successively transferred into guide 11 by coupling chambers 12 through 15. So far as transmission of this energy in guide 11 in the backward direction toward terminal C is concerned, the structure is inherently a directional coupler, i. e., a minimum transmission of energy in the backward direction will be found since the collective effect of a large number of discrete coupling elements spaced at less than one-half wavelength apart is of itself directionally selective as is well known in the directional coupler art. Any of the many distributions for a plurality of discrete points known to the art may, in addition, be used to improve the directivity or to increase the band width over which a given directivity is maintained. A number of these distributions are collected and analyzed in an article "Directive coupler in wave guides," by M. Surdin in the Journal of the Institution of Electrical Engineers, part IIIA, at page 725, any of which are suitable for the purposes of the present invention. As an alternative to providing a large number of chambers, however, a smaller number may be used which are spaced one-quarter wavelength apart. This will give a directionally selective effect as disclosed in United States Patent 2,562,281, granted July 31, 1951, to W. W. Mumford.

The present invention is concerned primarily with transmission of energy in the forward direction toward terminal D of guide 11. This transmission will be shown to depend upon the number and coupling factor of the frequency selective chambers, such as 12 through 15. Thus, energy of channel $f_1$ which is transferred from line 10 to line 11 through the first chamber 12, experiences the 90 degree phase delay which is a characteristic of the resonant chamber. This energy travels to the right in guide 11 to the second chamber 13 whereby a part of this energy returns to line 11 with a further phase delay of 90 degrees. Thus, energy which goes from line 10 to line 11 and back to line 10 by way of a later chamber arrives in line 10 out of phase with the channel $f_1$ energy which travels straight through line 10. A summation of such components eventually results in cancellation of all of the channel $f_1$ energy in line 10.

Designating the magnitude of the coupling afforded for frequency components of channel $f_1$ by each of the chambers 12 through 15 as C, and assuming an applied unit voltage for this energy, the voltage $V_1$ in line 11 at chamber 12, may be expressed $$V_1=C \tag{1}$$

and the voltage $E_1$ in line 10 as $$E_1=\sqrt{1-C^2} \tag{2}$$

Upon passing the second coupling chamber 13, these voltages become, respectively, $$V_2=\sqrt{1-C^2}\ V_1+CE_1=2C\sqrt{1-C^2} \tag{3}$$

and $$E=\sqrt{1-C^2}\,E_1-CV_1=1-2C^2 \qquad (4)$$

Employing the transformation $$C=\sin w \qquad (5)$$

$w$ being an angle employed for transformation purposes, Equations 3 and 4 may be expressed after $n$ coupling chambers as $$E_n=\cos nw \qquad (6)$$

$$V_n=\sin nw \qquad (7)$$

Equations 6 and 7 may then be rewritten in the form $$E_n=\cos \theta \qquad (8)$$

$$V_n=\sin \theta \qquad (9)$$

in which $\theta$ is the integrated coupling strength factor dependent upon the strength and distribution of the coupling between lines 10 and 11, and is equal to $$n \sin^{-1}C \qquad (10)$$

The functions of Equations 8 and 9 are plotted in Fig. 3 as curves 42 and 41, respectively, which indicate the magnitudes of the voltages in lines 10 and 11 as $\theta$ varies. The magnitude of the voltage V in line 11, represented by curve 41, is seen to increase sinusoidally and the voltage E, represented by curve 42, to decrease cosinusoidally as the integrated coupling is increased. All of the power in channel $f_1$ is transferred into line 11, therefore, when the quantity $n \sin^{-1}C$ is equal to $$\frac{m\pi}{2}$$

where $m$ is any odd integer.

In designing a branching filter in accordance with the invention a sufficient number of chambers are chosen to give adequate directional coupling. The cross-sectional dimensions of the chamber irises are then adjusted so that the coupling factor C of each satisfies Equation 10. To illustrate how this computation may be made by specific example, assume that 15 chambers, which should give adequate directivity in the usual case, are employed. Each chamber must, therefore, couple a voltage into line 11 of magnitude substantially 0.10453 that of the incident voltage in line 10.

As is now well known in the directional coupler art, higher directivity may be obtained by various tapered coupling distributions. Therefore, unequal coupling factors for the several chambers may be employed to reproduce any particular desired taper. In such a case, the power division may be analyzed as follows:

$$E_n=\cos (n_1w_1+n_2w_2+n_3w_3+\ldots n_kw_k) \qquad (11)$$

$$V_n=\sin(n_1w_1+n_2w_2+\ldots n_kw_k) \qquad (12)$$

where $E_n$ and $V_n$ are the voltages in line 11 and line 10, respectively, at the end of the series of couplings, and there are employed:

$n_1$ apertures of individual coupling $C_1$
$n_2$ apertures of individual coupling $C_2$
$n_3$ apertures of individual coupling $C_3$
$n_k$ apertures of individual coupling $C_k$ and the transformation $$C_1=\sin w_1$$
$$C_2=\sin w_2$$
$$C_k=\sin w_k$$

has been employed in writing the expressions. Equations 11 and 12 may be rewritten in the form $$E_n=\cos \theta \qquad (13)$$

$$V_n=\sin \theta \qquad (14)$$

for which the integrated coupling strength factor $\theta$ is now $$\theta=n_1 \sin^{-1}C_1+n_2 \sin^{-1}C_2+n_3 \sin^{-1}C_3 + \ldots n_k \sin^{-1}C_k \qquad (15)$$

In this case also, all of the power in channel $f_1$ is transferred into line 11 when $\theta$ is equal to $$\frac{m\pi}{2}$$

where $m$ is any odd integer.

It should be noted that the channel branching circuit of Fig. 1 is bilateral and symmetrical. Thus, if channels $f_1' \ldots f_n'$ are applied to the B terminal, channel $f_1'$ will be branched into the C terminal, while the remaining channels $f_n'$ pass to the A terminal. Channels may be applied simultaneously to the A and B terminals without interaction in view of the "balanced" condition of the wave-guide bridge structure. Conversely, if channel $f_1'$ were applied to terminal C and $f_n'$ to terminal A, the signals would all be combined in terminal B.

Several branching circuits of the types shown in Fig. 1 may be connected in cascade, each adapted to branch or to combine a successively different one of a plurality of channels. In general, therefore, a branching circuit such as that shown in Fig. 1 may replace the hybrid branching filters in systems employing particular channel arrangements of known channel branching or dropping filters, such for example, as disclosed by W. D. Lewis and L. C. Tillotson in an article, "A non-reflecting branching filter for microwaves," published in the Bell System Technical Journal, January 1948, vol. 27, pages 83 through 95 or as disclosed in United States Patent 2,531,447, granted to W. D. Lewis, November 28, 1950; United States Patent 2,561,212, granted to W. D. Lewis, July 17, 1951; and 2,531,419 granted to A. G. Fox, November 28, 1950. The directionally coupled line filter is, however, considerably more simplified in design, more straightforward in manufacture, and, therefore, substantially more economical than any of the prior art channel dropping filters.

Figs. 1A and 1B illustrate alternative means for coupling two sections of rectangular wave guide to obtain frequency-sensitive coupled line bridge circuits having electrical properties substantially identical to the bridge of Fig. 1. In Figs. 1A and 1B, only one coupling chamber in accordance with the invention is shown, it being understood that a plurality of them are employed in accordance with the proportions given above in connection with Fig. 1.

Referring to Fig. 1A, guides 62 and 63 are shown running for a length with their narrower faces substantially parallel and spaced apart by a distance $x$. A section of guide 64, which may be circular in cross-section and of a diameter approximately the same as the narrower dimension of guides 62 and 63, connects circular apertures 65 and 66 in opposite faces of guides 62 and 63, respectively. Guide 64 is filled with a material of high dielectric constant, such as polystyrene, so that while the physical diameter of guide 64 is considerably less than one-half wavelength of the wave energy in low dielectric filled guides 62 or 63, guide 64 remains nevertheless a wave guide above cut-off for the wave energy. Apertures 65 and 66 are smaller in cross-section than the corresponding cross-section of guide 64 and, therefore, constitute a pair of spaced irises with a resonant chamber therebetween. The resonant frequency of such a chamber is adjusted by varying the distance $x$, and will in the usual case resonate when $x$ is one-half wavelength of the waves measured in guide 64. Thus, having determined the number of chambers to be employed in accordance with directional coupler principles, the fraction of the power in one of the guides 62 or 63 which is coupled into the other through each of the chambers is adjusted in accordance with Equation 10 or Equation 15 by adjustment of the dimensions of irises 65 and 66.

In Fig. 1B the coupling means comprises a section of guide 68 which may be circular in cross-section, connecting apertures 69 and 70 in the opposite narrow faces of guides 62 and 63, respectively. Guide 68 is filled with the same substance as are guides 62 and 63, which in the usual case will be air or other gaseous filling. Thus, guide 68 operates in the range below cut-off and presents a high attenuation or low coupling factor dependent upon its length to wave energy passed therethrough. Unlike the coupling of Fig. 1A, the apertures 69 and 70 of Fig. 1B are substantially the same size as the diameter of guide 68 and, therefore, do not constitute irises in the sense of apertures 65 and 66. The resonant frequency of the coupling chamber of Fig. 1B is determined for a fixed diameter of guide 68 by the variable reactance introduced by screw 71.

Referring again to Fig. 3, it may be observed that when the integrated coupling strength factor $\theta$, whether for equal or unequal strength couplings, is equal to $$\frac{m\pi}{4}$$

where $m$ is any odd integer, the power in channel $f_1$ when applied to terminal A of Fig. 1, will appear equally in terminals B and D. Thus, a frequency-sensitive hybrid is provided by means of which an equal division of power is obtained. There will be a 90 degree phase difference between the power appearing at terminal D and power of the same frequency or frequencies, in guide 10 at terminals A or B.

The frequency-sensitive elements may be removed from the connecting guides in Figs. 1, 1A or 1B to provide an ordinary hybrid structure, i. e., a four-branch wave-guide bridge circuit in which power introduced at one branch A appears at equal levels in a pair of adjacent branches B and D but does not appear at the opposite branch C. This is recognized as the electrical property obtained in known microwave hybrid junctions such, for example, as the "magic tee" wave-guide hybrid structure, but in accordance with the present invention, this property is obtained by means of considerably simplified and more economical structures.

As the number of discrete coupling points, whether frequency sensitive or of unlimited frequency band, is greatly increased, the coupling distribution approaches that of a substantially distributed coupling. As is well known, the directivity of a directional coupler is improved by employing a substantially distributed coupling.

In Fig. 2, a coupled line power dividing network is shown in which substantially distributed coupling between the lines is provided by a divided aperture. This network comprises a first section 32 of shielded transmission line which may be a hollow conductive rectangular wave guide as shown, having terminal connections 25 and 26 at each of its ends. Located adjacent to line 32, and having a portion of its length contiguous to a portion of line 32, is a second transmission line 31 for guiding wave energy which may be a rectangular wave guide as shown and having terminal connections 27 and 28 at its respective ends. A portion of the adjacent walls 30 of each of the two guides 31 and 32, which walls are parallel to the electric vector 33 of wave energy, or the narrow wall of each of guides 31 and 32 assuming normal dominant mode excitation therein, has been removed to provide a slot into which an insert 29 is placed to form a common wall between the adjacent wave guides 31 and 32. Insert 29 is provided with a divided rectangular aperture 35. The exact nature and the coupling characteristics to be expected from a divided aperture such as 35 are fully disclosed and claimed in the copending application of A. G. Fox, Serial No. 236,556 of July 13, 1951, now Patent 2,701,342, granted February 1, 1955, and in my above-identified copending application. It is sufficient to state here that aperture 35 is an elongated rectangular aperture of longitudinal dimension $l$ and transverse dimension $\alpha$ extending through the contiguous walls of guides 31 and 32 as shown, and is termed "divided" since extending parallel across the transverse or narrow dimension of aperture 35 is a grid comprising a plurality of conductive dividers or wires 36. The dimensions and spacing of wires 36 are set forth in detail in the above-mentioned applications. This divided aperture provides a current coupling between lines 31 and 32 which is distributed to a substantial degree along the length $l$ of the aperture. The directional coupling characteristics of such a divided aperture is also disclosed in the above-mentioned applications.

As to the character of the power transferred in the forward direction in accordance with the present invention, including the specific relationships for equal power division and for complete power transfer, the substantially distributed coupling of divided aperture 35 or of a coupling having such a large number of discrete coupling points that the coupling may be considered as substantially distributed, may be analyzed as follows:

Assume, therefore, that a unit voltage of wave energy is applied to guide 32 as represented by vector 33, and that no wave is impressed on guide 31. The envelope of the traveling wave in the incident guide 32 within a length interval so small that negligible power is transmitted between guides 32 and 31 may be expressed $$\frac{dE}{dl}=-\alpha E+\alpha V \qquad (16)$$

and the forward traveling wave in the secondary guide 31 may be expressed as $$\frac{dV}{dl}=-\alpha V+\alpha E \qquad (17)$$

wherein $\alpha$ represents the continuous coupling per unit length between the lines and $l$ represents the distance over which this coupling is maintained.

Equations 16 and 17 may be rewritten under the conditions specified above as $$E=\tfrac{1}{2}(1+\epsilon^{-2\theta'}) \qquad (18)$$

$$V=\tfrac{1}{2}(1-\epsilon^{-2\theta'}) \qquad (19)$$

in which $\theta'$ is the integrated coupling strength dependent upon the strength of the distributed coupling and the distribution or distance over which it is maintained and is equal to $$\theta'=\alpha l_1 \qquad (20)$$

Converting Equations 18 and 19 from the exponential form to the trigonometric form, their absolute values become $$E=\cos\theta' \qquad (21)$$

$$V=\sin\theta'_1 \qquad (22)$$

With this redefinition of the integrated coupling factor, therefore, Fig. 3 serves again to represent the magnitude of waves in the two lines. The wave magnitude in the incident guide 32, represented by curve 42, is seen to decline cosinusoidally and the wave magnitude in the secondary guide 31 to increase sinusoidally as the integrated coupling strength factor is increased.

The transverse dimension of divided aperture 35 determines the power coupling between lines 31 and 32. It may be easily shown that the transfer of power through this path varies substantially as the square of the current coupling, which in turn varies directly as the transverse dimension of aperture 35. Thus, the factor $\alpha$ in the above expressions is directly proportional to the transverse dimension of aperture 35 and the factor $l$ represents the longitudinal dimension of the aperture. These two dimensions may, therefore, be proportioned according to Equation 20 to give an integrated coupling strength producing any desired division of power between lines 31 and 32. Of particular interest are the specific relationships giving complete power transfer and equal power division. When the integrated coupling factor, as represented by the product $\alpha l$, is equal to $$\frac{m\pi}{2}$$

radians, where $m$ is any odd integer, all of the power will be transferred from the incident guide 32 into the secondary guide 31. When the product $\alpha l$ is equal to $$\frac{m\pi}{4}$$

radians, the power applied to guide 32 will be divided equally between the other end thereof and guide 31.

Fig. 4 illustrates how the principles of the invention may be extended to a three line power dividing network or hybrid structure. In Fig. 4, such a network is shown comprising a middle section of wave guide 45 coupled on both of its narrow walls by oppositely located divided apertures 46 and 47 to secondary guide sections 48 and 49, respectively. Thus, guide 45 is coupled with equal strength to guides 48 and 49, but no direct coupling exists between guides 48 and 49.

Assume that a unit voltage is applied to the A terminal of guide 45 from a driving source 50. As in the structures of Figs. 1 and 2, the coupling between the guides is directionally selective so that no backward wave is launched in guides 48 and 49. The envelopes of the forward traveling waves in the three lines, $E_1$ and $E_3$ representing the voltages in lines 48 and 49, respectively, while $E_2$ represents the voltage in the driven line 45, may be expressed as follows:

$$\frac{dE_1}{dl} = -\alpha E_1 + \alpha E_2 \quad (23)$$

$$\frac{dE_2}{dl} = \alpha E_1 - 2\alpha E_2 + \alpha E_3 \quad (24)$$

$$\frac{dE_3}{dl} = \alpha E_2 - \alpha E_3 \quad (25)$$

The solution to these three equations for $E_1=E_3=0$ at $l=0$ and $E_2=1$ at $l=0$ may be written as $$E_1=E_3=\tfrac{1}{3}(1-\epsilon^{-3\theta'}) \quad (26)$$

$$E_2=\tfrac{1}{3}(1+2\epsilon^{-3\theta'}) \quad (27)$$

in which the integrated coupling strength factor $\theta'$ is equal to $\alpha l$, the product of the coupling strength of the divided aperture and its length.

The functions of Equations 26 and 27 are plotted on Fig. 5 which indicate the magnitudes of the voltages in the three lines 45, 48 and 49 as functions of the integrated coupling strength factor. Power applied to the A terminal of line 45 is divided into three equal parts appearing in terminals C, B and D when $\theta'$ is equal to $$\frac{2\pi m}{9}$$

or $$\frac{4\pi m}{9}$$

radians, where $m$ is any odd integer. For these values of $\theta'$ there will be a 120 degree phase angle between $E_2$ and $E_1$ or $E_3$. For other values of $\theta'$ the phase angle will be different from 120 degrees. When $\theta'$ is equal to $\pi/3$ the power in lines 48 and 49 is at a maximum with the remaining power in line 45 representing a loss of 0.52 decibel compared to a transfer of all power into lines 48 and 49. By altering the phase constant of line 45, such as by decreasing the wide dimensions thereof slightly relative to the wide dimensions of guides 48 and 49, complete power may be transferred into lines 48 and 49 with none remaining in line 45.

It should be noted that apertures 46 and 47 are located opposite to each other along the longitudinal length of line 45. This condition is necessary for the power division defined. Any other location would merely duplicate the operation of two cascaded two-line devices of Fig. 2 in which each auxiliary line branched off a given fraction of the energy incident upon it without relation to the power branched by the other.

If one of the side lines, for example, 48 is driven by a source of energy 51 instead of the center line 45 as described above, symmetry no longer exists. Equations corresponding to 26 and 27 above, representing respectively the new relationship in the voltages in lines 48, 45 and 49, may be given:

$$E_1=\tfrac{1}{3}+\tfrac{1}{6}\epsilon^{-3\theta'}+\tfrac{1}{2}^{-\theta'} \quad (28)$$

$$E_2=\tfrac{1}{3}(1-\epsilon^{-3\theta'}) \quad (29)$$

$$E_3=\tfrac{1}{3}+\tfrac{1}{6}\epsilon^{-3\theta'}-\tfrac{1}{2}^{-\theta'} \quad (30)$$

The functions of these equations are plotted on Fig. 6 which indicate the magnitudes of the voltage in the three lines as functions of the integrated coupling strength factor. It should be noted that the voltage $E_2$ goes through a complete cycle in $\theta'=\tfrac{2}{3}$ which is the same period required in the case above with the center line driven. For $E_1$ and $E_3$, however, a full cycle requires $\theta'=2$, three times the interval required for $E_2$.

The unique and varied power dividing properties of the network of Fig. 4, either with the center line driven or with one of the side lines driven, immediately suggest many useful applications. For example, a plurality of antenna units may be connected to the terminals C, B and D to be driven in equal or unequal amplitudes in order to obtain a desired combined radiation pattern.

The principles of the invention are by no means limited to a combination of three lines as illustrated since these principles may be extended to a power dividing network having an unlimited number of terminals by increasing the number of coupled transmission lines.

In all cases, it is understood that the above-described arrangements are simply illustrative of a small number of the many possible specific embodiments which can represent applications of the principles of the invention. Numerous and varied other arrangements can readily be devised in accordance with the principles by those skilled in the art without departing from the spirit and scope of the invention.

What is claimed is:

1. In a multichannel electromagnetic wave transmission system, a main section of wave guide, a multichannel wave energy signal applied to one end of said section, means for branching the wave energy of one channel from the remaining channels of said multichannel energy, said means comprising an auxiliary section of wave guide running for a portion of its length substantially parallel to said main guide, each of said guides having a plurality of openings longitudinally spaced at less than one-half wavelength of the wave energy in said one channel, a plurality of substantially identical connecting wave-guide sections connecting each opening in said main guide to a corresponding opening in said auxiliary guide, means included in each of said connecting guides for passing similar frequency components exclusively from said one channel, each of said connecting guides adapted to couple a given fraction C of the frequency components of said one channel in said main guide into said auxiliary guide, the number of said connecting guides being equal to $$\frac{m\pi}{2\sin^{-1}C}$$

wherein $m$ is any odd integer, whereby substantially all the wave energy of said one channel is coupled into said auxiliary guide.

2. An electromagnetic wave energy power dividing network comprising a first section of shielded transmission line, a second section of shielded transmission line, a source of multifrequency wave energy having frequency components within a given band and frequency components outside said band connected to one of said lines, a plurality of frequency sensitive connections between said lines distributed along the longitudinal length of said lines, each of said connections having similar band pass characteristics corresponding in frequency to said given band for coupling a fraction of wave energy from the same band of frequencies to the exclusion of energy outside of said band from one line into the other, the arithmetical summation of the angles whose sines represent each of said coupling fractions being equal to a multiple of $\pi/4$ radians.

3. The combination according to claim 2 wherein each of said frequency sensitive connections between said lines couples a fraction C of said wave energy, and wherein the number of said connections is equal to a multiple of $$\frac{\pi}{4 \sin^{-1} C}$$

4. The combination according to claim 3 wherein the number of said connections is equal to $$\frac{m\pi}{2 \sin^{-1} C}$$

where $m$ is any odd integer, whereby the entire electromagnetic wave energy within said given band of frequencies is transferred from one line into the other.

5. The combination according to claim 2 wherein $n_1$ of said frequency sensitive connections between said lines couples a fraction $C_1$ of said wave energy, $n_2$ couples a fraction $C_2$, and $n_k$ couples a fraction $C_k$, and wherein the integrated coupling strength factor given by the summation of $n_1 \sin^{-1} C_1 + n_2 \sin^{-1} C_2 \ldots n_k \sin^{-1} C_k$ is equal to a multiple of $\pi/4$ radians.

6. The combination according to claim 5, wherein said integrated coupling strength factor is equal to $$\frac{m\pi}{2}$$

radians, where $m$ is any odd integer, whereby the entire wave energy within said given band of frequencies is transferred from one line into the other.

References Cited in the file of this patent

UNITED STATES PATENTS

| | | |
|---|---|---|
| 2,531,777 | Marshall | Nov. 28, 1950 |
| 2,541,910 | Bangert | Feb. 13, 1951 |
| 2,626,990 | Pierce | Jan. 27, 1953 |
| 2,632,809 | Riblet | Mar. 24, 1953 |
| 2,679,631 | Korman | May 25, 1954 |
| 2,735,069 | Riblet | Feb. 14, 1956 |

OTHER REFERENCES

Riblet: "A Mathematical Theory of Directional Couplers," Proceedings of the I. R. E., vol. 35, No. 11; published November 1947, pp. 1307–1313.